US011981484B2

(12) United States Patent
Hofenauer et al.

(10) Patent No.: US 11,981,484 B2
(45) Date of Patent: May 14, 2024

(54) LABELLING ARRANGEMENT FOR A MULTI-PART CONTAINER, SYSTEM AND METHOD FOR APPLYING A LABELLING ARRANGEMENT TO A MULTI-PART CONTAINER

(71) Applicants: Schreiner Group GmbH & Co. KG, Oberschleissheim (DE); Bausch+Stroebel Maschinenfabrik Ilshofen GmbH + Co. KG, Ilshofen (DE)

(72) Inventors: Andreas Hofenauer, Germering (DE); Stefan Krauss, Munich (DE); Tanja Messmer, Renningen (DE); Robert Unglert, Munich (DE); Harald Reber, Wolpertshausen (DE)

(73) Assignees: SCHREINER GROUP GMBH & CO. KG, Oberschleissheim (DE); BAUSCH+STROEBEL MASCHINENFABRIK ILSHOFEN GMBH + CO. KG, Ilshofen (DE)

( * ) Notice: Subject to any disclaimer, the term of this patent is extended or adjusted under 35 U.S.C. 154(b) by 220 days.

(21) Appl. No.: 17/416,102

(22) PCT Filed: Dec. 18, 2019

(86) PCT No.: PCT/EP2019/086003

§ 371 (c)(1),
(2) Date: Jun. 18, 2021

(87) PCT Pub. No.: WO2020/127518

PCT Pub. Date: Jun. 25, 2020

(65) Prior Publication Data

US 2022/0081176 A1 Mar. 17, 2022

(30) Foreign Application Priority Data

Dec. 21, 2018 (DE) ........................ 102018133408.7
Feb. 15, 2019 (DE) ........................ 102019103878.2

(51) Int. Cl.
*B65D 55/08* (2006.01)
*A61J 1/05* (2006.01)
(Continued)

(52) U.S. Cl.
CPC ............ *B65D 55/0818* (2013.01); *B65C 3/24* (2013.01); *B65D 41/46* (2013.01); *B65D 51/18* (2013.01);
(Continued)

(58) Field of Classification Search
CPC .... B65D 55/0818; B65D 41/46; B65D 51/18; B65D 2251/0031; B65D 2251/0078
(Continued)

(56) References Cited

U.S. PATENT DOCUMENTS 3,335,889 A * 8/1967 Brumme ................ B65D 41/46 215/253
4,540,101 A 9/1985 Kutcher
(Continued)

FOREIGN PATENT DOCUMENTS

CN 203698918 U * 7/2014 ............ B65D 41/62
CN 104010943 A 8/2014
(Continued)

OTHER PUBLICATIONS

International Search Report in PCT/EP2019/086003, dated Apr. 21, 2020.

*Primary Examiner* — J. Gregory Pickett
*Assistant Examiner* — Niki M Eloshway
(74) *Attorney, Agent, or Firm* — Collard & Roe, P.C.

(57) ABSTRACT

A labelling arrangement for a multi-part container includes a sleeve-shaped cap element having an interlocking structure
(Continued)

Figure 1:
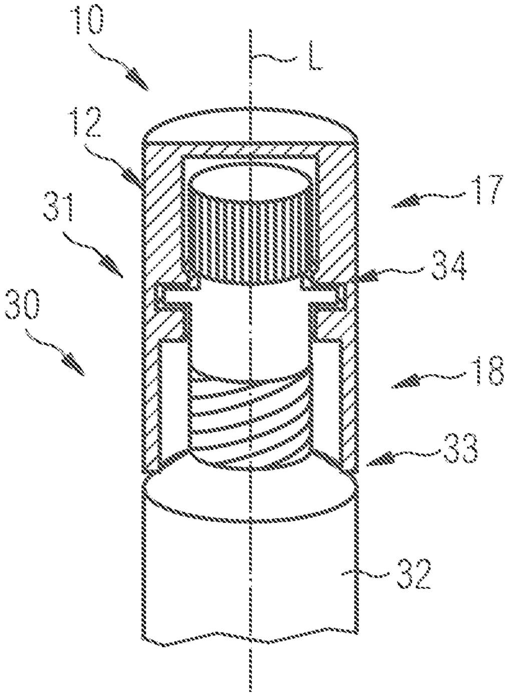

adapted to be applied to a first part of the container and coupled to the first part by the interlocking structure. The labelling arrangement further includes a sealing label adapted to be attached to a second part of the container by a second label portion and to surround the applied cap element by a first label portion. The labelling arrangement further includes at least one severing region so that, when the container applied with the labelling arrangement is opened, the labelling arrangement is severable in the severing region and at least a part of the cap element is removable together with the first part of the container from the second part of the container.

18 Claims, 14 Drawing Sheets

(51) Int. Cl.
*B65C 3/24* (2006.01)
*B65D 41/46* (2006.01)
*B65D 51/18* (2006.01)

(52) U.S. Cl.
CPC .............. *A61J 1/05* (2013.01); *A61J 2205/30* (2013.01); *B65D 2251/0031* (2013.01); *B65D 2251/0078* (2013.01)

(58) Field of Classification Search
USPC .......................................................... 215/230
See application file for complete search history.

(56) References Cited

U.S. PATENT DOCUMENTS

| | | | |
|---|---|---|---|
| 5,092,477 | A | 3/1992 | Johnson, Jr. et al. |
| 5,595,314 | A | 1/1997 | Weiler |
| 7,632,244 | B2 | 12/2009 | Buehler et al. |
| 8,784,377 | B2 | 7/2014 | Ranalletta et al. |
| 8,864,708 | B1 | 10/2014 | Vitello |
| 9,499,331 | B2 | 11/2016 | Seyfferth De Oliveira |
| 9,669,974 | B2 | 6/2017 | Wochele et al. |
| 9,815,613 | B2 | 11/2017 | Seyfferth De Oliveira |
| 10,781,020 | B2 | 9/2020 | Greiner-Perth et al. |
| 2008/0308443 | A1 | 12/2008 | Baklycki et al. |
| 2019/0106269 | A1 | 4/2019 | Cailleaux |

FOREIGN PATENT DOCUMENTS

| | | | | |
|---|---|---|---|---|
| CN | 104114465 | A | 10/2014 | |
| CN | 108883872 | A | 11/2018 | |
| DE | 19547431 | A1 | 6/1997 | |
| DE | 69513567 | T2 | 7/2000 | |
| DE | 102014201697 | A1 | 6/2015 | |
| DE | 102016210992 | B3 | 5/2017 | |
| EP | 0716860 | B1 | 9/2002 | |
| EP | 1169075 | B1 | 11/2006 | |
| EP | 2014570 | A1 | 1/2009 | |
| ES | 2199699 | A1 | 2/2004 | |
| WO | 91/18800 | A1 | 12/1991 | |
| WO | 2008/153580 | A1 | 12/2008 | |
| WO | WO-2020139242 | A1 * | 7/2020 | ........... B65D 47/123 |

* cited by examiner

LABELLING ARRANGEMENT FOR A MULTI-PART CONTAINER, SYSTEM AND METHOD FOR APPLYING A LABELLING ARRANGEMENT TO A MULTI-PART CONTAINER

CROSS REFERENCE TO RELATED APPLICATIONS

This application is the National Stage of PCT/EP2019/086003 filed on Dec. 18, 2019, which claims priority under 35 U.S.C. § 119 of German Application Nos. 10 2018 133 408.7 filed on Dec. 21, 2018 and 10 2019 103 878.2 filed on Feb. 15, 2019, the disclosures of which are incorporated by reference. The international application under PCT article 21(2) was not published in English.

The present invention relates to a labelling arrangement for a multi-part container, which can contribute to a reliable tamper protection for the container in a simple and cost-effective manner. The invention also relates to a use of such a labelling arrangement for a multi-part container, and to a system comprising such a labelling arrangement and a multi-part container. The invention further relates to a method of applying such a labelling arrangement to a multi-part container.

Labelling arrangements typically comprise a label which may be used for authorisation as well as authentication or proof of origin. For example, a labelling arrangement is used when it is necessary to protect ingredients against unauthorised access and to identify when the associated container has been opened. This applies in particular to containers in the pharmaceutical and medical fields, the contents of which are to be protected against manipulation.

It is an object underlying the invention to contribute in a simple and cost-effective manner to a reliable identification for a multi-part container.

The object is solved by the features of the independent patent claims. Advantageous embodiments are given in the respective sub claims.

According to an aspect of the invention, a labelling arrangement for a multi-part container comprises a sleeve-shaped cap element that has an interlocking structure on an inner surface thereof and that is adapted to be applied to a first part of the container and coupled to an outer surface of the first part by the interlocking structure. The labelling arrangement further comprises a sealing label having a first label portion and a second label portion adjacent the first label portion, the second label portion being adapted to be secured to a second part of the container and the first label portion being adapted to surround the applied cap element with respect to a state of the sealing label applied to the container. The labelling arrangement further comprises at least one severing portion, such that when the container applied with the labelling arrangement is opened, the labelling arrangement is severable in the severing portion and at least a portion of the cap element is removable together with the first part of the container from the second part of the container together.

According to a preferred embodiment, the first label portion is configured to be attached to the applied cap element with respect to a state of the sealing label applied to the container, such that the sealing label couples the cap element to the second part of the container.

According to a preferred embodiment of the labelling arrangement, the sealing label comprises a severing portion arranged between the first and second label portions, so that when the container applied with the labelling arrangement is opened, the sealing label is predeterminedly severable in its severing portion and the first label portion together with the at least one part of the cap element and the first part of the container is removable from the second label portion and the second part of the container.

Alternatively or additionally, the cap element has a severing portion. According to a further preferred embodiment, the cap element is formed in two parts and has a severing area, wherein the cap element has a first cap portion and a second cap portion in relation to a longitudinal axis of the labelling arrangement or of the cap element, and the severing area of the cap element is formed between the first and the second cap portion. Therefore, when the container applied with the labelling arrangement is opened, the cap element is predeterminedly severable in the severing area of the cap element and the first cap portion is removable together with the first part of the container from the lower cap portion and the second part of the container.

By means of the described labelling arrangement, among other things, a reliable and cost-effective sealing solution for syringes is feasible. The labelling arrangement enables a secure sealing of, for example, primary packaging or containers in the pharmaceutical field, such as syringes, injection vials or vials, whereby an intactness of a medicament packaging can be guaranteed or indicated. The labelling arrangement prevents unintentional reuse of a suitably labelled primary packaging after its use and indicates clearly visibly and reliably an initial opening of the primary packaging. In this way, the labelling arrangement also counteracts manipulation of the primary packaging or indicates this by means of a proof of initial opening.

If the cap element has a severing area, connecting webs can be formed in this area, which connect the upper, first cap portion to the lower, second cap portion. When the container is opened by pulling and/or turning the attached cap element, the connecting webs break open and allow the first cap portion together with the first part of the container firmly coupled therein to be removed from the remaining components.

If the sealing label has a severing area, a severing element in the form of one or more perforations is preferably arranged therein. Alternatively or additionally, a tear strip may be provided in the severing area of the sealing label. By means of a tear strip, the sealing label can be specifically cut through when the container is opened. Thus, a controlled severing of the sealing label along the predetermined perforation or the tear strip can be carried out in a simple and cost-effective manner A perforation can in particular also be combined with punch-outs or branches upwards and/or downwards in order to leave clearly visible damage after the sealing label has been cut and the container has been opened. For example, the perforation can be jagged to provide a clearly visible indicator of an initial opening.

Alternatively or additionally, the sealing label may have a film or film element in the severing area that has a relatively low tear strength so that easy tearing and severing of the film element is possible. Such a film element is, for example, in the form of an acetate film and does not require a separate perforation or other weakening structure to enable easy tearing.

However, the labelling arrangement may also be configured such that the first label portion of the sealing label encloses the first part of the container in a sleeve-like manner without being adhesively coupled to or with the first part of the container. The first label portion can thus enclose the cap element all around with respect to its longitudinal axis without contact or without adhesion. The first label portion then forms a label sleeve that is open at the top with respect to the longitudinal axis. When the container is opened, the first label portion is then pressed against an outer surface of the cap element and separated from the second label portion by pulling and/or turning and removed together with the cap element and the first part of the container from the second part of the container.

According to such an embodiment, the first label portion is preferably formed such that there is only a narrow gap or space between the attached cap element and the surrounding first label portion. Manipulation or an attempt to open by reaching into the narrow gap from above will result in the first label portion being torn or crumpled, so that such an operation will leave recognisable marks.

In the context of this description, terms such as "top" and "bottom" refer to an operational arrangement or application of the labelling arrangement and the container. This also applies to terms such as "head" and "body", whereby the head is usually to be arranged at the top and the body usually at the bottom. The first part of the container forms, for example as an upper part, a head of an injection vial or syringe, and can comprise a cap, a lid or a primary closure or a primary cap which is removed to open the container. The second part of the container then forms, for example as a lower portion, a body of the injection vial or syringe which realizes a receptacle for holding and storing a predetermined content.

The first label portion of the sealing label is associated with the upper, first part of the container, which is removed to open the container, and can therefore also be referred to as the upper label portion. The second label portion of the sealing label is associated with the lower, second part of the container and remains on the body or receptacle of the container after opening and can therefore also be referred to as the lower label portion.

The container forms a primary vessel to which the labelling arrangement is attached in a predetermined manner as a secondary component. The cap element can therefore also be referred to as a secondary cap, which is attached to the primary cap of the container. In the following, the labelling arrangement is described predominantly in conjunction with a syringe, which is, for example, a multi-part primary vessel with a syringe head and a syringe body. However, the principle is also applicable to other pharmaceutical packages, such as injection vials or vials. The syringe head comprises, for example, a primary closure of the syringe, for example in the form of a removable primary cap, which is specifically covered with the cap element as a further cap or secondary cap. The secondary cap is attached to the syringe, in particular to the syringe body, by means of the sealing label and connects the secondary cap to the syringe body. In this way, a reliable and secure sealing of the primary vessel can be established, which counteracts unauthorised manipulation of the vessel contents and clearly indicates a first use or an opening that has already taken place. The sealing label can therefore also be referred to as a security label, as it contributes to the security of the vessel contents or the condition of the vessel.

The described labelling arrangement enables in particular a subsequent sealing of pre-filled syringes. By means of the cap element, an adapter for a primary cap or the first part of the vessel is realised, which enables geometry compensation between the syringe head and the syringe body, especially for large-volume syringes of, for example, 10 ml, 20 ml or 50 ml volume. Therefore, the labelling arrangement also contributes to a simple, automated and process-reliable labelling capability of such vessels. Usually, the vessel head is geometrically smaller than the vessel body. In the case of rotationally symmetrical containers, such as a syringe, this refers in particular to a diameter of the two container parts. By means of the cap element to be fitted, the diameter of the head area is enlarged in a targeted manner and, for example, brought into line with a diameter of the body area. In this way, the sealing label can be applied particularly easily and reliably to the vessel adapted with the cap element.

The sealing label has, for example, an adhesive layer on an underside which enables easy application and attachment to the second part of the vessel and to the fitted cap element. Preferably, an outer surface of the cap element is predeterminedly roughened and/or has a microstructure which contributes to a particularly reliable adhesion of the sealing label. An outer surface of the secondary cap is optimised for the adhesion of the sealing label equipped with adhesive or it is designed for an intended application of the sealing label. This can be achieved by choosing a plastic with a high surface energy and/or roughness of the surface. The outer surface of the secondary cap can also be divided into two parts, with a lower part as described being set up for bonding to the security label, and an upper part having, for example, a corrugation that enables grippy handling for a rotary movement. The sealing label can also provide a certain roughness or grip and contribute to an improved feel of the vessel provided with the labelling arrangement.

The sealing label can have a single or multiple layer design. For example, it can be a wrap-around label or an all-around label that encloses a circumference in relation to a longitudinal axis of the container. Alternatively, the geometry of the sealing label can be such that it only partially covers a circumference of the container. In terms of height or length, the sealing label may partially or completely cover the container from the bottom to the top, or from a foot end of the vessel body to a head end of the vessel head. Alternatively, the sealing label may extend beyond a height or length of the container and be applied to the head of the container in addition to the side on the attached cap element.

According to a further preferred embodiment, the cap element has a contour on the inner surface which comprises the interlocking structure and which is preformed in coordination with a contour on the outer surface of the first part of the container. Particularly preferably, the inner contour of the cap element is formed such that it forms a negative shape to a circumferential contour on the outer surface of the first part of the container. By means of such an inverse shaping of the inner contour of the cap element, a particularly reliable hold on the primary cap of the container can be established. The cap element forms a form-fitting secondary cap, which as an adapter for the primary cap realizes a geometry compensation and provides a stable and firm hold on the container.

The toothed structure preferably has at least one toothed element which is designed to engage in a recess on the outer surface of the first part of the container when the cap element is attached to the first part of the container and to couple the cap element to the first part of the container. For example, the one or more interlocking elements are each in the form of a latching hook which is arranged to form a positive coupling with the first part of the container so that with respect to a longitudinal axis of the cap element a holding force is established between the cap element and the first part in the direction of the longitudinal axis.

Such a latching hook can be formed circumferentially on an inner side of the cap element and latch on an annular groove of the primary cap when the cap element is pushed onto the primary cap or the first part of the container. In this way, a reliable positive-locking connection is formed between the cap element and the first part of the container and a holding force acting in the direction of the longitudinal axis is established, which counteracts a withdrawal of the cap element from the container. If necessary, a rotation of the cap element relative to the inner primary cap is still possible. When the container is opened, the cap element is then removed from the container or the container body with a certain tensile force and takes the internal primary cap of the container with it. Such a design can be particularly useful for syringes that have an attached closure.

Alternatively or additionally, a toothed element is arranged and formed such that an engaging form fit can be formed with the outside of the first part of the container, which inhibits a relative rotational movement of the cap element around the longitudinal axis by a holding force. This may contribute to a directional withdrawal of the cap element without undesirable rotation thereof about the primary closure. Furthermore, opening of the container by means of a rotational movement can be set up in this way, in which a transmission of force is initiated due to the rotationally fixed form closure between the primary and secondary cap. When the container is opened, the holding force of the primary cap on the container body must then be overcome by a rotary movement.

For example, a toothed element of the toothed structure may be web- or pin-shaped with respect to a longitudinal axis of the cap element and may be adapted to form a positive-locking connection with the first part of the container so that, with respect to the longitudinal axis, a holding force is established between the cap element and the first part in a radial direction about the longitudinal axis.

According to a preferred further embodiment, the cap element comprises a recess penetrating a wall of the cap element, so that the possibility of a fluid exchange between an inner space and an outer space of the cap element is established. Such a fluid opening may, for example, be provided in an upper or a lower region in the cap element and enable fluid exchange. Preferably, a plurality of fluid openings are provided to allow gas and/or liquid to pass there through. By means of a penetrating recess, a space between the primary cap and the attached cap element can be ventilated and help to ensure that an undesired media entrapment in the space does not cause adverse effects on the container and its contents and on the attached labelling arrangement.

Preferably, the labelling arrangement includes an adhesive layer disposed on an underside of the sealing label such that the sealing label is disposable on the container by means of adhesion. Insofar as the applied sealing label extends to the severing area of the cap element or insofar as the sealing label itself comprises a severing portion, the sealing label preferably has an adhesive-free surface in the severing portion. Thus, easier severing of the labelling arrangement and removal of the separable portion of the labelling arrangement is enabled. A required force for separating the cap element and/or the sealing label is reduced compared to a fully adhesive sealing label, and an opening dynamic of the container applied with the sealing label is improved.

The respective severing area or severing portion can be formed, in particular in coordination with the container to be applied, in a region of the cap element and/or of the sealing label which, in an applied state to the container, is associated with a transition between the first part and the second part of the container. The severing area is located, for example, in a region of a lower end of the primary cap. A sufficiently forceful turning and/or pulling on the first part of the container or on the attached cap element simultaneously results in a predetermined severing of the labelling arrangement. However, the severing area may also be arranged in other regions which allow the cap element or the sealing label to be severed when the container is opened. In particular, if the sealing label has multiple layers, the severing area can be arranged, for example, well below the area of the lower end of the primary cap, so that the upper layer of the sealing label tears in a predetermined manner due to an acting tensile and/or rotational force.

In addition, a severing element, for example in the form of a perforation or a tear strip, can be provided in the severing area, which enables controlled severing of the respective component. In addition, the sealing label may be formed, for example in the area of the first label portion, with predetermined surface properties that enable easier opening of the container and severing of the sealing label by the user. Such beneficial surface features can be realised, for example, with anti-slip lacquers, by means of printed tactile elements or a surface micro-structuring, which enable a safer gripping of the first label portion.

According to a particularly preferred embodiment, the labelling arrangement comprises an opening detection element that is arranged in the severing area of the cap element and/or of the sealing label and that is designed to indicate a removal of at least a part of the cap element and/or of the first label portion of the sealing label together with the first part of the container from the second part of the container. Such an opening detection element may be implemented, for example, in the form of a detachable section of the first and/or second label portion of the sealing label. The detachable section may be coupled to the first label portion so that when the container is opened, the section is removed together with the first label portion and clearly indicates an initial opening. Preferably, a coloured area and/or lettering is arranged under the section, which is exposed by the removal and clearly visibly indicates an initial opening.

The connecting webs between the upper and lower cap sections of a two-piece cap element, if provided, can also serve as an opening detection element. After the container has been opened, broken web sections remain on the upper and lower cap sections so that, similar to a water bottle cap, it can be seen that an opening of the container has already taken place.

Furthermore, the cap element can also be formed in two parts without connecting webs. The two separate cap sections are then arranged, for example, at a distance from each other on the primary cap of the container. Such a design is suitable, for example, if an area of the primary part of the container to be arranged between the cap sections is wider than the areas adjoining it at the top and bottom. The primary closure has, for example, a bead which realizes the widest part of the first part of the container transversely to the longitudinal axis.

This may concern, for example, a primary closure for a syringe with a Luer-thread, which has a larger diameter at the widest point than adjacent regions and the syringe body itself. For example, the syringe body has a diameter of 10.85 mm, while the bead on the syringe head has a diameter of 10.95 mm. The cap sections of the cap element then cover, as individual adapter parts, the areas of the primary closure that have a smaller diameter than the syringe body and the widest part of the primary closure.

When the cap element is put on, the annular lower cap section, for example, can be pushed over the bead. The lower cap section is preferably slotted and has an expansion joint or a recess that allows it to be slipped over the bead.

Alternatively or additionally, the lower cap section may also provide a certain stretchability specific to the material to enable easy and reliable fitting to the first part of the container. In this regard, the lower cap section may have a predetermined internal structure in coordination with an external structure of the container head to enable directional push-on. Subsequently, the upper cap section can be fitted.

Another possibility of arranging the cap element on the first part of a container with a bead is that the annular lower cap section is placed on the container head before the primary closure and subsequently the primary closure is fixed to the container head. In relation to a Luer-threaded syringe, the primary closure is then threaded into the thread provided on the syringe head. The lower annular cap section then does not require, for example, a slit to provide expandability. The upper cap section can then be fitted.

However, it is also possible to arrange a two-part cap element on the first part of a container with a bead, in which the upper and lower cap sections are coupled with connecting webs. The cap element is then fitted by placing both cap sections in one on the container head or the primary closure of the container and pushing them on. The lower cap section preferably has a slit or recess and is designed to be rotation-independent with regard to its internal structure. Thus, an expandability of the lower cap section is provided and it can be pushed safely and reliably over the bead. The upper cap section preferably has a predetermined rotation-dependent inner structure which, adapted to the outer structure of the primary cap, enables it to be pushed on in a directed manner. The secondary cap is then interlocked with the primary cap by rotating the upper cap section, whereby the lower cap section, which is independent of rotation, follows the rotational movement of the upper cap section to a certain extent due to the coupling by the connecting webs. In this regard, the connecting webs are configured to provide a corresponding amount of bead space between the upper and lower cap sections. For example, the connecting webs are formed to be slightly curved and/or stretchable.

The cap element may be made of a material that allows it to be seen through, thereby allowing visual inspection of the primary closure. For example, the cap element is formed from a transparent plastic. This could be particularly useful for a lower cap section or for a lower part of the cap element which, for example, covers a Luer-thread of a syringe. Thus, inspection of the syringe tip from the outside is possible, for example to check whether air bubbles have formed or collected in the neck of the syringe.

According to a further aspect, the invention comprises using an embodiment of the described labelling arrangement for a container that can be divided into several parts.

According to another aspect of the invention, a system comprises a divisible container having a first part and a second part and an embodiment of the labelling arrangement as described above applied to the container such that the cap element is applied to the first part of the container and the sealing label is attached to the container and to the applied cap element. The second label portion of the sealing label is attached to the second part of the container and the first label portion of the sealing label is attached to the cap element applied to the first part of the container. The sealing label thus also helps to hold and secure the cap element and the primary closure located thereunder.

In that the use and the system relate to or comprise an embodiment of the described labelling arrangement, all of the described properties and features of the labelling arrangement are, where applicable, also disclosed for the use and for the system, and vice versa.

According to another aspect of the invention, a method of applying a labelling arrangement to a multi-part container comprises providing a container divisible into a plurality of parts comprising a first part and a second part, providing a sleeve-shaped cap element having an interlocking structure on an inner surface, and providing a sealing label having a first label portion and a second label portion adjacent the first label portion, wherein the cap element and the sealing label forming the labelling arrangement having at least one predetermined severing area. The method further comprises placing the cap element on the first part of the container and coupling the interlocking structure of the cap element to an outer surface of the first part of the container. The method further comprises attaching the sealing label to the container by attaching the second label portion to the second part of the container and attaching the first label portion to the attached cap element, so that the sealing label couples the cap element to the second part of the container and, when the container applied with the labelling arrangement is opened, the labelling arrangement can be cut through in a predetermined manner in the severing area and at least part of the cap element can be removed together with the first part of the container from the second part of the container.

According to an embodiment of the method, attaching and coupling the cap element to the first part of the container comprises attaching the cap element to the first part of the container such that an interlocking element of the interlocking structure engages a recess on an outer surface of the first part. In particular, attaching and coupling the cap element to the first part of the container may comprise rotating and aligning the cap element relative to the first part of the container with respect to the longitudinal axis of the cap element prior to attaching the cap element to the first part. Thereafter, the cap element can be pushed on in a simple and directed manner in the direction of the second part of the container until the cap element engages in a groove of the first part of the container, for example with a snap-in hook, and snaps into place. The fitted and engaged cap element can then be rotated around the first part so that a toothed element of the interlocking structure engages in a recess on an outer surface of the first part and further couples the cap element and the first part of the container.

By means of the described application method, it is possible to use the properties and features provided by the labelling arrangement in relation to the container to be labelled to form a secure and reliable label that provides a clearly identifiable proof of first opening. In that the method relates to applying an embodiment of the described labelling arrangement, the described properties and features of the labelling arrangement are also disclosed for the method, where applicable, and vice versa.

In the following, the described labelling arrangement is explained again for the most part using the example of a container formed as a two-part syringe, which can be realised in particular as a plastic syringe or glass syringe with or without a Luer-Lock thread/adapter. However, the properties and features can also be transferred with respect to other multi-part containers.

According to a particularly preferred embodiment of the labelling arrangement, the secondary cap or the attached cap element is removed together with the primary closure when the container applied with the labelling arrangement is opened, and the sealing label is at least partially destroyed, thus clearly indicating an initial opening. The secondary cap is mechanically interlocked with the primary closure in such a way that when the secondary cap is removed, the primary closure is also removed. The interlocking structure enables a force transmission from the secondary cap to the primary closure, in particular perpendicular to a longitudinal axis of the syringe or the cap element. In the case of a rotational and/or pulling movement, there is also a transmission of force parallel to the longitudinal axis for removing the secondary cap including the primary closure of the syringe.

The interlocking structure comprises an internal structure of the secondary cap for stable interlocking and secure coupling with the primary closure and may also be designed for directional attachment of the secondary cap. In particular, the secondary cap may be formed as an injection moulded plastic part with the internal coupling or interlocking structure. The inner structure of the secondary cap represents, for example, a negative mould of an outer surface of the primary cap.

Also, the inner structure of the cap element can be formed in such a way that a rotationally position-independent placement on the primary cap is possible. This can be achieved, for example, by numerous flexible webs or pins which, as one embodiment of the negative shape, project inwards on the inner side of the secondary cap and flexibly nestle against the structure of the outer side of the primary closure and in this way mechanically interlock with the surface of the primary closure. The sleeve-shaped secondary cap or cap element preferably comprises internal horizontal and vertical structural elements for mechanical fixation with or to the primary cap of the container.

The labelling arrangement makes it possible that no additional work step is required for opening the syringe or the vessel, and also that no separate or further individual part remains as waste after opening. This can be particularly useful in a surgical environment. The secondary cap specifically increases the diameter of the twist-off cap element, which means, among other things, that less force has to be applied to open it due to a larger lever arm. This also counteracts the effect of rotational difficulty caused by the security or sealing label to be cut.

A further function of the labelling arrangement is that, in the case of prefillable glass syringes with a Luer-Lock closure, a plastic thread attached to the glass syringe is held in place by the described labelling arrangement, and rotation of the plastic thread is prevented or at least counteracted, in particular when a cannula is screwed in. In addition, the labelling arrangement helps to prevent or counteract the Luer-thread from coming off, in particular when administering a highly viscous medication, such as hyaluronic acid.

The labelling arrangement described has an advantageous effect, among other things, on labelling a glass syringe with a Luer-Lock adapter. If the secondary cap or cap element is made in two parts and has a ring- or sleeve-shaped lower part and a cap-shaped upper part, the lower part can contribute to an improved hold of the Luer-Lock thread. The two-part cap element may be attached to the syringe in one or more process steps, for example by first attaching the annular lower cap part and subsequently attaching the upper cap part. If the cap element is to be applied to the primary cap of the container in one process step, the inner structure of the cap element is preferably to be formed in a predetermined manner, taking into account the outer structure of the primary cap to be adapted. The lower part of the secondary cap can have structures on the inner side, for example fine grooves, which are suitable for a rotationally position-independent fitting, so that fitting of the secondary cap with a directed inner structure in the upper part to the outer structure of the primary cap and the outer side of the Luer-Lock thread is possible in one process step.

In addition, the lower part of the secondary cap may have a slot or recess that provides a certain elasticity of the cap element to allow it to expand when passing the primary cap during the fitting process and thereby not get caught on any protrusions of the primary cap outer surface. This lower ring or the second, lower cap part of the cap element can be designed by its material properties in such a way that the ring-shaped initial form moves back again independently after the elastic expansion. In addition, in a next step, the slotted lower part of the secondary cap can be closed or narrowed and fixed with the sealing label by a contact pressure of massaging rollers when the container is labelled. The inner structure of the lower part of the secondary cap is thereby pressed onto an outer side of the Luer-Lock thread, so that an interlocking between the lower part of the secondary cap and the outer side of the Luer-Lock thread is also achieved.

In order to fit the upper part of the secondary cap or the first cap portion together with the second cap portion onto the primary closure in one operation, it may also be helpful for both cap portions to be connected to each other via one or more connection webs. Furthermore, a hinge function as coupling means between the cap portions is also conceivable. In this case, it could be advantageous if the connection webs are designed in such a way that the breakage of the connection webs does not significantly increase the necessary rotational force during an opening process of the syringe or the container.

By means of the sealing label and the cap element of the labelling arrangement, the primary container is enclosed, as if by a second skin, which can provide additional protective functions for the medicament or the contents of the container. Such a protection can include protection against UV radiation as well as against penetration or leakage of a solvent, humidity or other small-molecule substances and can be functionally switched on due to the design of the labelling arrangement.

It is therefore not necessary to provide additional adhesive connections or complex crushing connections in order to reliably and securely seal a syringe. The labelling arrangement can be implemented cost-effectively in large quantities and can be used for various vessels. Such a vessel can be realised in particular as a plastic syringe (e.g. COC/COP) or glass syringe.

The labelling arrangement preferably comprises the cap element in the form of a plastic component and the security or sealing label as the labelling medium. The cap element may also enclose the Luer-Lock thread. The interlocking of the secondary cap with the primary closure forms a mechanical positive and/or frictional locking connection, by means of which a rotational movement for unscrewing the primary closure from a thread or an opening of the container and removing the adapted primary closure is possible.

In particular, the secondary cap uses existing structures on the primary cap, such as a corrugation or a horizontally extending indentation. The secondary cap may also have a corrugation or other surface structure on an outer side, which contributes to a better grip and feel. An inner structure of the secondary cap for interlocking with the primary closure may also be designed for a straight fitting of the secondary cap.

A syringe labelled by means of the described labelling arrangement can be opened without an additional work step and, moreover, no additional waste component is produced. The secondary cap is preferably designed to match the container in terms of diameter, so that when placed on the primary cap it is flush with an outer surface of the syringe. In this way, a particularly advantageous labelling capability can be contributed to. The sealing label can therefore be stuck easily and flatly from the syringe body to the secondary cap.

If the primary closure has a comparably large diameter as the syringe body, the secondary cap is preferably to be designed relatively thin and, in an extreme case, represents a kind of lattice structure which essentially compensates for the depressions on the outside of the primary closure. Thus, by means of the cap element, a homogeneous surface can be formed on the container, which has at least approximately the same circumference as the syringe body and enables easy labelling.

If the secondary cap cannot be made flush with the syringe barrel, and thus the diameter of the secondary cap is larger than the diameter of the syringe barrel, for example, a step that arises between the secondary cap and the syringe barrel can be compensated for by a partial multilayer of the sealing label. For example, the second label portion has three layers, while the first label portion of the sealing label has only one layer.

By means of a suitable adhesive-neutralised surface above the perforation combined with a partial double layer of the sealing label, if necessary, a coloured surface and/or lettering can be exposed when the syringe is opened and the sealing label is cut through, whereby an initial opening is indicated even more clearly. Here, it is also possible to integrate a removable partial label into the labelling arrangement, for example for documentation purposes. It is also possible to integrate a tear strip as an opening and/or severing mechanism. A perforation may be provided, if necessary, together with a predetermined bulge in the security label, which forms a grip tab, so that the security or sealing label below the primary cap is destroyed in a controlled manner by rotation with the tear strip and the primary cap can be removed together with the cap element and the upper part of the sealing label, which was above the tear strip.

The secondary cap may be of one-piece or multi-piece design. With respect to a two-piece embodiment, the second, lower cap portion mechanically interlocks with the outer surface of an attached Luer-Lock thread provided, for example, on a glass syringe. The first, upper cap portion of the secondary cap interlocks with the outside of the primary closure. Thus, a form-fit and/or force-fit can be established for a rotational movement for unscrewing the primary cap from the thread as well as for a movement for removing the cap. In addition, the Luer-Lock thread can be fixed to the syringe by means of the sealing label, which is glued from the syringe body at least up to the Luer-Lock thread area.

Depending on the embodiment, the safety label may be glued from the syringe body to the lower part or to the upper part of the secondary cap. In particular, the lower part of the secondary cap may serve to fix the Luer-Lock thread, if one is provided on the container. The upper part of the secondary cap or the first cap portion serves to twist on the syringes and to remove the primary closure, analogous to the design for a plastic syringe.

If parts of the secondary cap are connected to each other with retaining webs, these can serve as a feature for the initial opening indication. In this case, it is sufficient, for example, if the safety label only extends to a parting line between the upper and lower parts of the secondary cap. This fixes the lower part of the secondary cap and thus the Luer-Lock thread to the syringe. If the secondary cap has a two-piece design and the parts of the secondary cap are not connected to each other, the sealing label preferably extends to the upper part of the secondary cap. The sealing label then has a predetermined breaking point in the area of the lower part of the secondary cap, for example in the form of a perforation, as well as preferably an adhesive neutralisation above the perforation, which tears in a predetermined manner during the rotational movement for opening the syringe and allows the primary closure to be removed together with the upper part of the secondary cap.

With regard to a multi-part design of the secondary cap, the lower part of the secondary cap remains at least partially glued with the sealing label even after removal of the primary closure and is thus connected to the syringe body, thereby fixing the Luer-Lock thread to the syringe. It is also conceivable that only the lower part of the secondary cap is used. According to such an embodiment, only a sleeve would be present, which, connected to the safety label, fixes the Luer thread to the syringe. It is therefore not mandatory that the cap element is closed at a top side. In relation to a cross-sectional plane along the longitudinal axis, the cap element can therefore form a U-shape, which has three adjoining closed sides, or have a hollow cylindrical shape, which has two opposite open ends.

For example, if the container is a plastic syringe, for example COC/COP, the labelling arrangement is configured as follows:

- secondary cap mechanically interlocked with the primary closure of the syringe
- inner structure of the secondary cap is designed for directional placement on the primary closure of the syringe, for example in the form of a (partial) negative imprint of the structure of the outside of the primary closure or designed for placement on the primary closure independent of the rotational position, for example in the form of flexible webs or pins
- secondary cap, for example, circumferentially identical to the outer surface of the syringe
- a surface of the secondary cap optionally designed for adhesion of the safety label
- a surface of the secondary cap optionally divided into two parts (one part is optimised for adhesion of the safety label, one part is designed to be grippy for handling)
- the sealing label, which connects the syringe body with the secondary cap, is preferably formed with a perforation
- the sealing label can be at least partially double-layered in order to expose a coloured area and/or lettering when the syringe is opened (providing a so-called "tamper evidence function")
- the sealing label can be at least partially double-layered in order to compensate for a different circumference of the syringe body and the Luer-Lock thread or primary closure area.

If the container is designed as a glass syringe, for example, the labelling arrangement is designed as follows:

- the secondary cap is optionally divided into two parts: a lower part covers a Luer-Lock threaded area and an upper part covers the primary closure
- the lower cap part and the upper cap part of the secondary cap are optionally connected to each other with retaining webs
- the lower part of the secondary cap is optionally mechanically interlocked with the Luer-Lock thread
- the upper part of the secondary cap is optionally mechanically interlocked with the primary cap
- an internal structure of the secondary cap is designed for directional seating on the primary closure and/or a Luer thread, for example in the form of a (partially) negative imprint of the structure of the outside of the primary closure and/or the Luer thread, or designed for seating on the primary closure and/or the Luer thread independent of the rotational position, for example in the form of flexible bars or pins the lower part of the secondary cap is designed, for example, to be circumferentially identical to an outer surface of the syringe the upper part of the secondary cap is made, for example, circumferentially the same as an outer surface of the syringe a surface of the lower part of the secondary cap can be optimised or predefined for the adhesion of a label a surface of the upper part of the secondary cap can be optimised or predefined for the adhesion of the sealing label and/or a further label a surface of the upper part of the secondary cap is optionally designed in two sections (one section is for adhesion of the sealing label, one section is for easy handling)

the sealing label connecting either the syringe body to the lower part of the secondary cap or the syringe body to the lower and upper part of the secondary cap or the syringe body to the upper part of the secondary cap preferably has a perforation as a severing element the sealing label can be at least partially double-layered in order to expose a coloured area and/or lettering when the labelled syringe is opened (providing a so-called "tamper evidence function")

the sealing label can be at least partially double-layered in order to compensate for a different circumference of the syringe body and a Luer thread or primary closure area.

In that, depending on the embodiment, the secondary cap or a Luer-Lock thread and the primary closure are preferably formed to be circumferentially the same as the outer surface of the syringe and their surface is at least partially formed for adhesion of a label, in particular the sealing label, a label can be bonded from the syringe body into the Luer-Lock or primary closure region using a conventional rotary labelling process.

Figure 4:
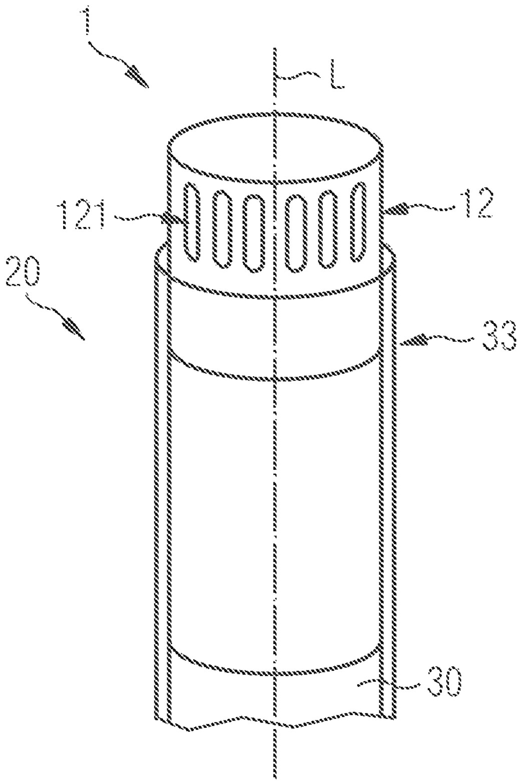
Figure 5:
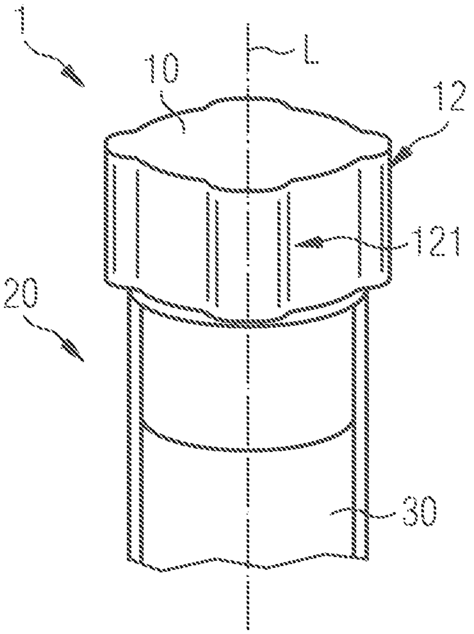
Figure 6A:
Figure 6B:
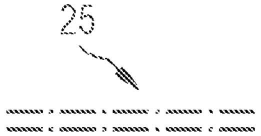
Figure 6C:
Figure 7A:
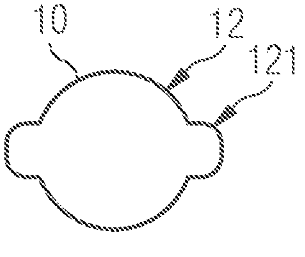
Figure 7B:
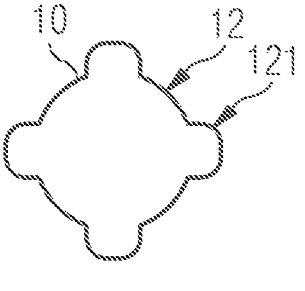
Figure 17:
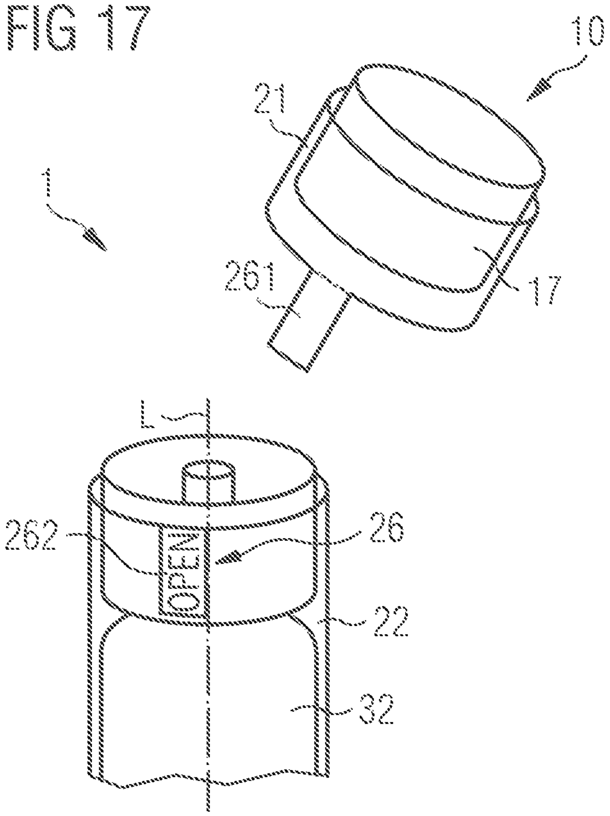
Figure 18A:
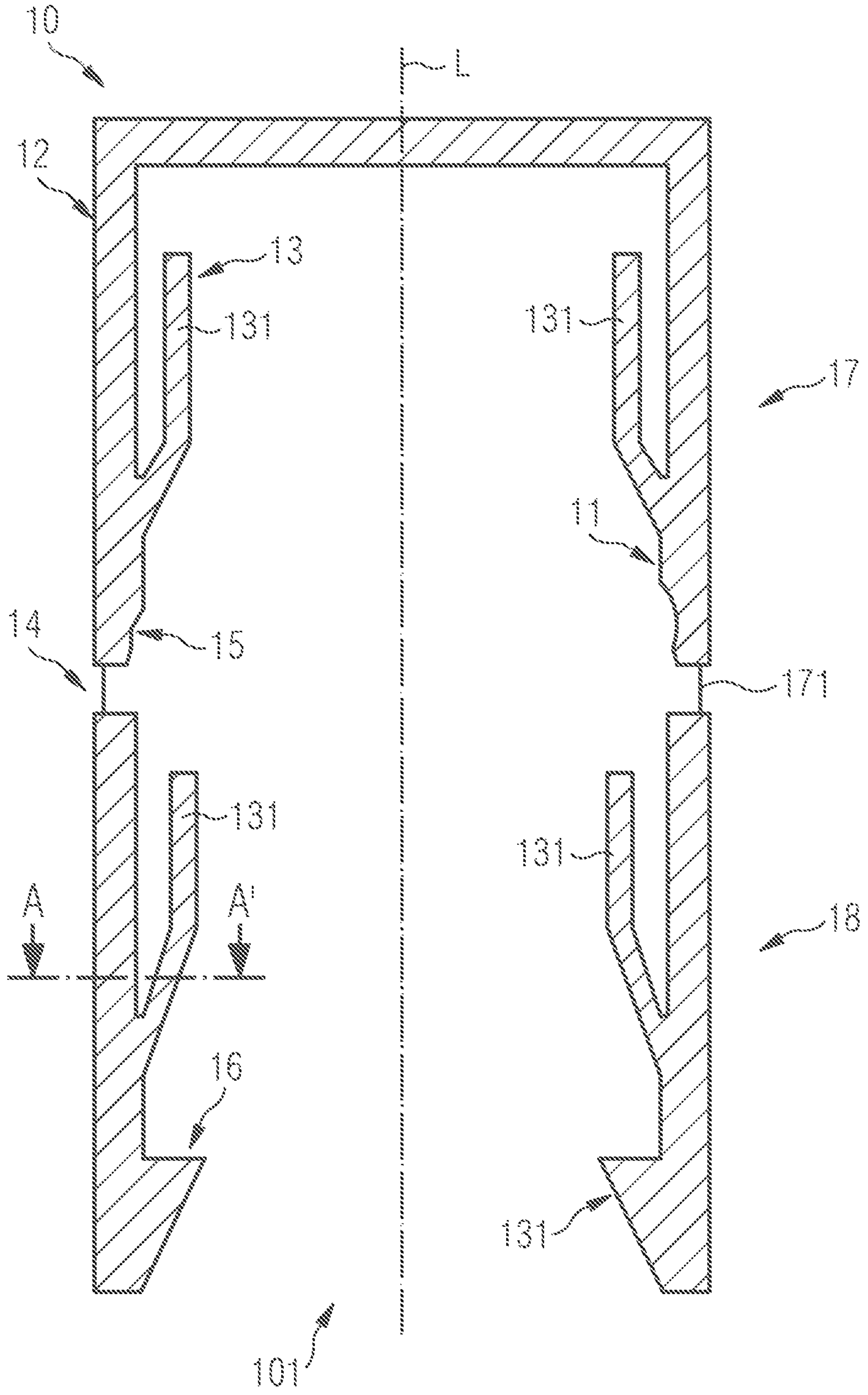
Figure 18B:
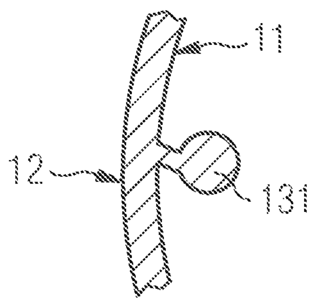
Figure 18C:
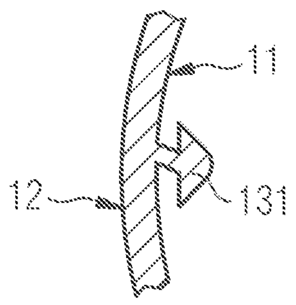
Figure 18D:
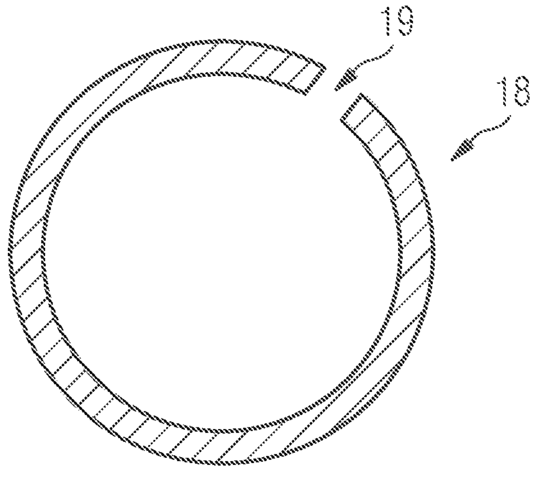
Figure 18E:
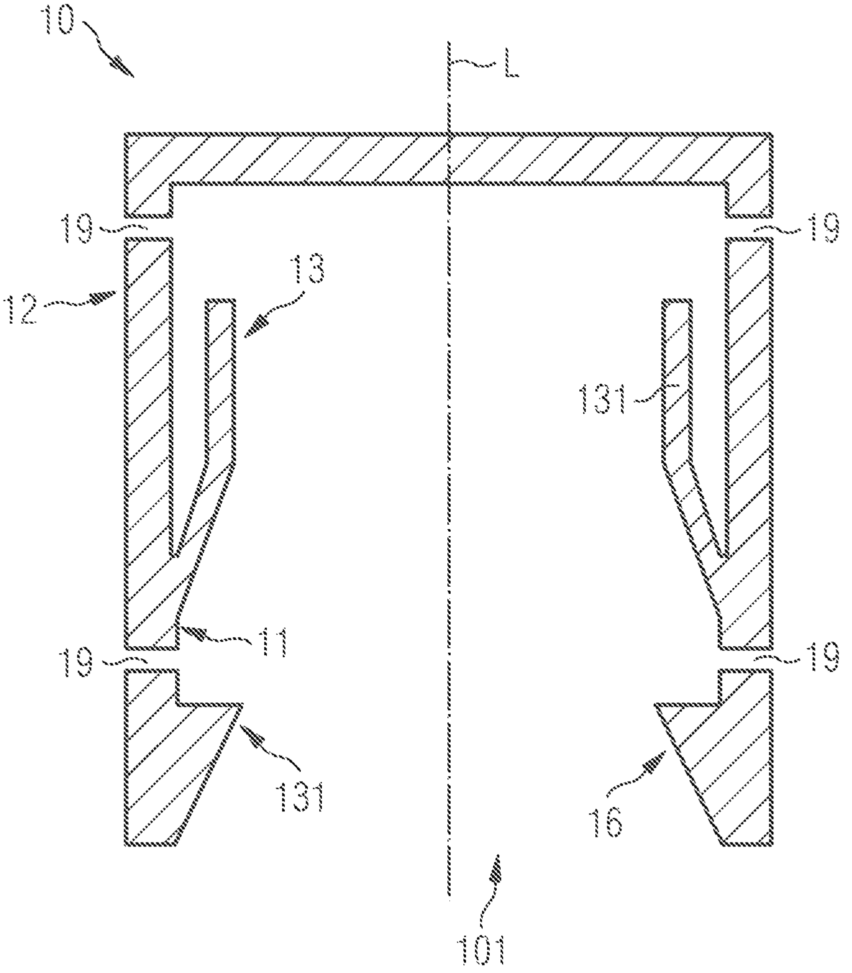
Figure 18F:
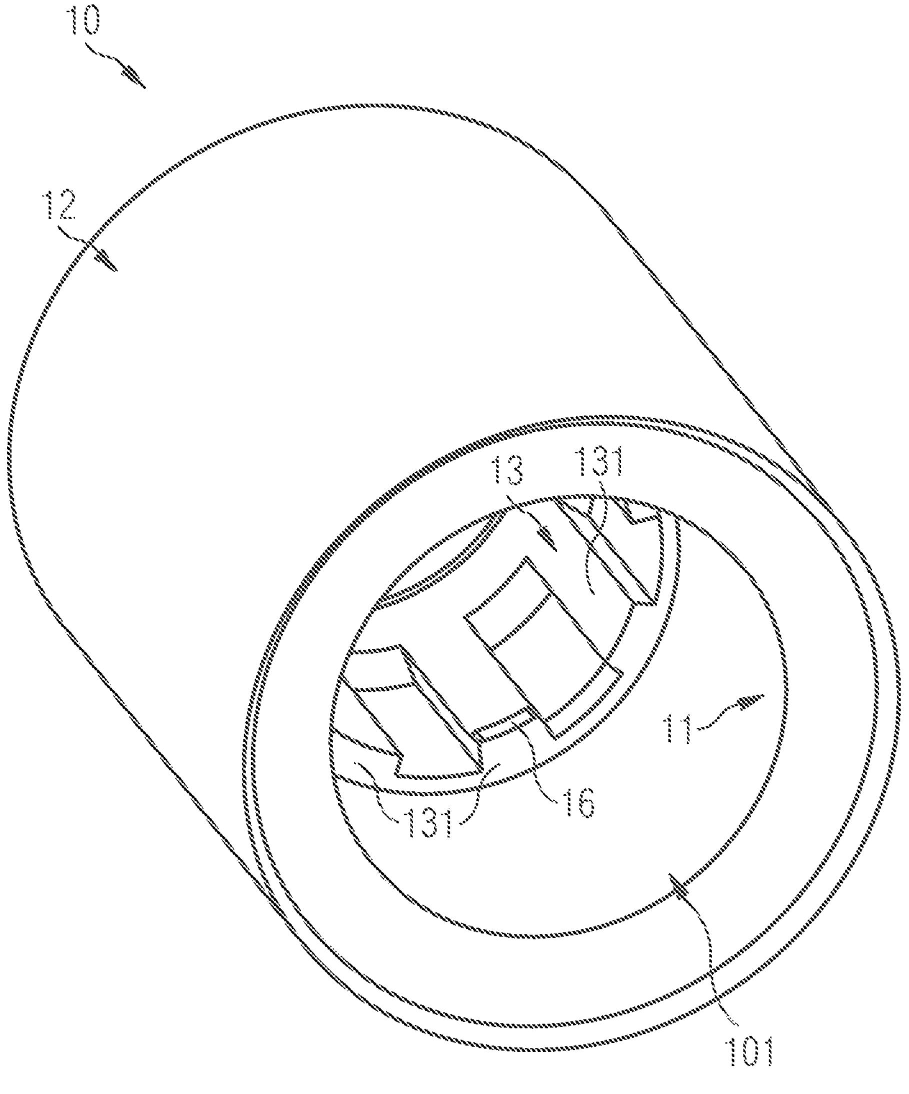
Figure 19:
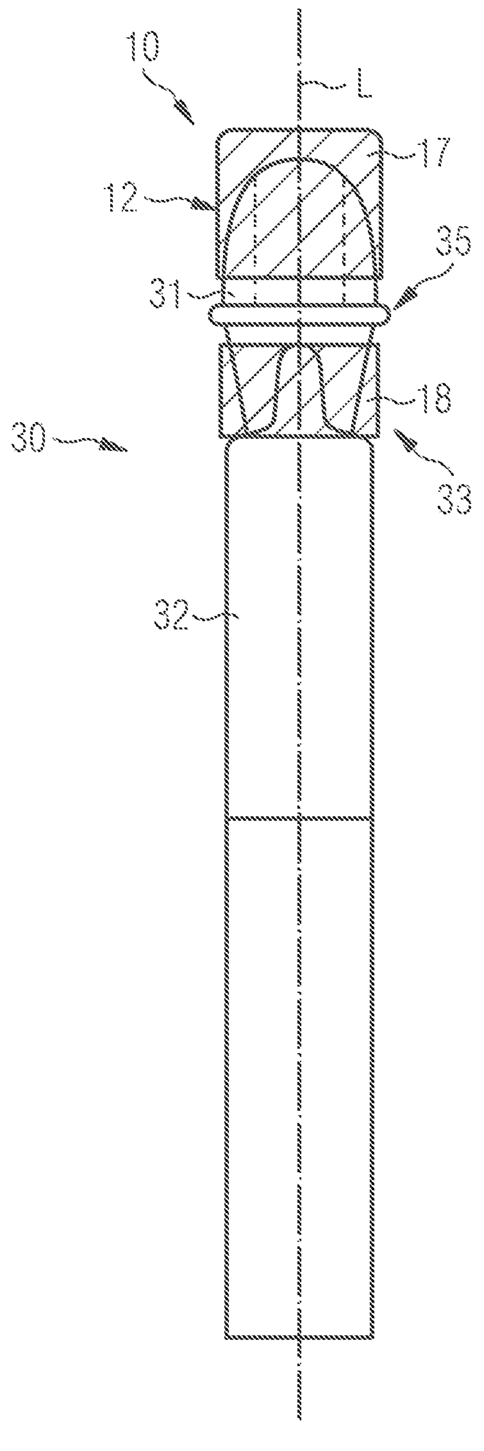
Figure 20:
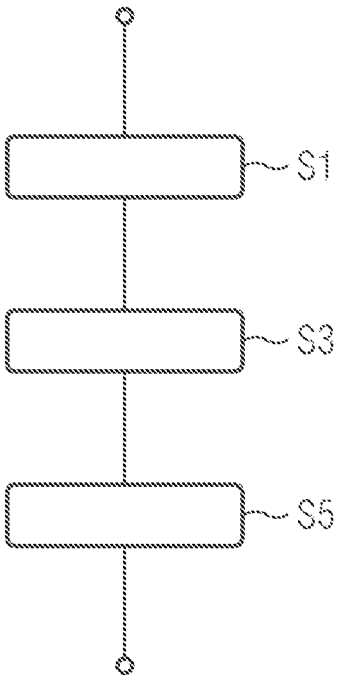

In the following, embodiments of the described labelling arrangement are explained with reference to schematic drawings. They show:

FIGS. 1-5 various embodiments of a labelling arrangement for a multi-part container, FIGS. 6A-6C various embodiments of a severing element of the labelling arrangement, FIGS. 7A-7B various embodiments of a contour of a cap element of the labelling arrangement, FIGS. 8-12 further embodiments of the labelling arrangement for a multi-part container, FIGS. 13A-13E further embodiments of a contour of the cap element of the labelling arrangement, FIGS. 14-17 further embodiments of the labelling arrangement for a multi-part container, FIGS. 18A-18F further embodiments of a contour of the cap element of the labelling arrangement, FIG. 19 a further embodiment of the cap element of the labelling arrangement, and FIG. 20 a flow chart of a method for applying a labelling arrangement for a multi-part container.

Elements of the same construction and function are marked with the same reference signs across the figures. For reasons of clarity, not all of the elements shown in all of the figures may be identified with the corresponding reference signs.

FIGS. 1-5 show embodiments of a labelling arrangement 1 for a multi-part container 30, which can be produced at low cost and enables reliable and secure initial opening verification of the container 30 provided with the labelling arrangement 1.

Figure 2:
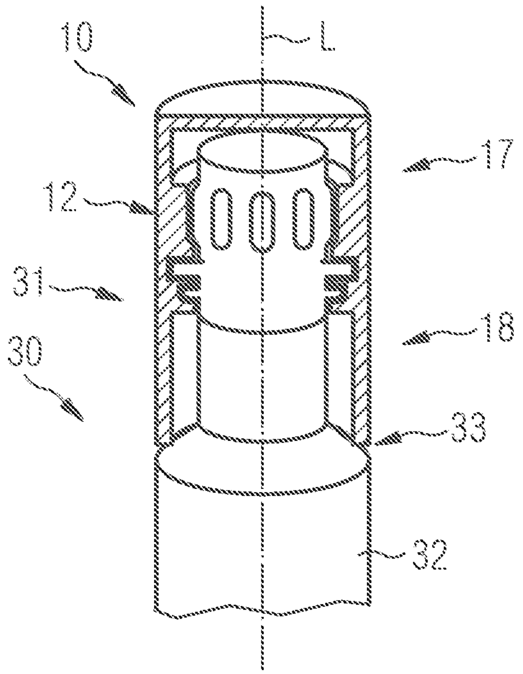
Figure 3:
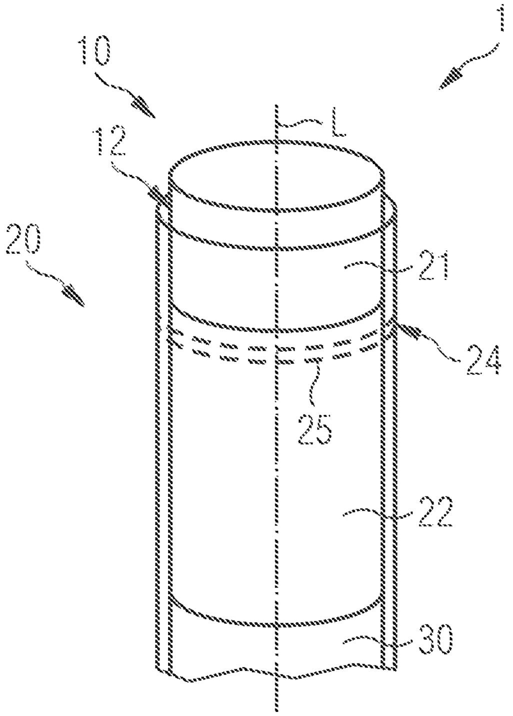

The labelling arrangement 1 comprises a cap element 10 and a sealing label 20. FIGS. 1 and 2 illustrate embodiments of the cap element 10 of the labelling arrangement 1 arranged on the container 30. FIGS. 3 to 5 illustrate embodiments of the cap element 10 in cooperation with the sealing label 20. The cap element 10 is sleeve-shaped and has an interlocking structure 13 on an inner surface 11, and is further adapted to be applied to a first part 31 of the container 30 and to be coupled to an outer surface 34 of the first part 31 by means of the interlocking structure 13.

The sealing label 20 comprises a first label portion 21 and a second label portion 22 adjacent the first label portion 21, the second label portion 22 is configured to be attached to a second part 32 of the container 30 (see, for example, FIGS. 3 and 4). The first label portion 21 is configured to surround the applied cap element 10 with respect to a state of the sealing label 20 applied to the container 30. Preferably, the first label portion 21 is adapted to be attached to the applied cap element 10 in a condition applied to the container 30 such that the sealing label 20 couples the cap element 10 to the second part 32 of the container 30. The two label portions 21 and 22 of the sealing label 20 preferably form mutually adjacent parts of a common material web.

The labelling arrangement 1 further comprises at least one severing portion 14, 24 (see, for example, FIGS. 3, 10 and 12), so that when the container 30 applied with the labelling arrangement 1 is opened, the labelling arrangement 1 can be severed in a predetermined manner in the severing portion 14, 24 and at least a part of the cap element 10 can be removed together with the first part 31 of the container 30 from the second part 32 of the container 30.

By means of the described labelling arrangement 1, a reliable and cost-effective sealing solution for syringes can be realised, among other things. The labelling arrangement 1 enables a secure sealing of, for example, primary packaging in the pharmaceutical field, such as injection vials or vials, whereby an intactness of a medicament packaging can be guaranteed or at least clearly indicated. The labelling arrangement 1 prevents unintentional reuse of a suitably labelled primary packaging after use and clearly visibly and reliably indicates an initial opening of the primary packaging. Thus, by means of the labelling arrangement 1, tampering with the primary packaging is also counteracted or indicated by a first-opening proof.

The container 30 can be designed as a glass syringe or plastic syringe, as an injection vial, as a vial or other receptacle, which has a removable head for opening, which is arranged on or at a body of the container 30. In the context of this description, terms such as "top" and "bottom" refer to an operational arrangement or application or orientation of the labelling arrangement 1 and the container 30. This also applies to terms such as "head" and "body", where the head is usually to be arranged at the top and the body usually at the bottom. The first part 31 of the container 30 forms, for example, as an upper part, a head of a syringe, and comprises, for example, a cap, a lid or a primary closure or primary cap which is removed to open the container 30. The second part 32 of the container 30 then forms, for example as a lower part, a body of the syringe, which realizes a receptacle for receiving and storing a predetermined content.

The first label portion 21 of the sealing label 20 is associated with the upper, first part 31 of the container 30 and may therefore also be referred to as the upper label portion 21. The second label portion 22 of the sealing label 20 is associated with the lower, second part 32 of the container 30 and remains on the body or receptacle of the container 30 after opening and can therefore also be referred to as the lower label portion 22.

The container 30 thus forms a primary vessel to which the labelling arrangement 1 is predefined to be attached as a secondary component. The cap element 10 may therefore also be referred to as the secondary cap 10, which is attached to the primary cap 31 of the container 30. In the following, the labelling arrangement 1 is described predominantly in cooperation with a syringe as the container 30, which has a syringe head and a syringe body. However, the principle is also applicable to other pharmaceutical packaging, such as injection vials or vials.

The syringe head comprises, for example, a primary cap 31 of the syringe 30, for example in the form of a removable primary cap 31, which is specifically covered with the cap element 10 as a further cap or secondary cap 10. The secondary cap 10 is attached to the syringe 30, in particular to the syringe body 32, by means of the sealing label 20 and connects the secondary cap 10 to the syringe body 32. In this way, a reliable and secure seal can be set up for the primary container 30, which counteracts unauthorised manipulation of the contents of the container and clearly indicates a first use or an opening that has already taken place. The sealing label 20 can therefore also be referred to as a security label 20, as it contributes to security of the container contents or the container condition.

FIGS. 1 and 2 show a container 30 realizing a COC/COP Luer-Lock syringe. In FIGS. 1 and 2, among others, it is illustrated that the cap element 10 has a contour on the inner surface 11 which is predefined in coordination with a contour on the outer surface 34 of the first part 31 of the container 30. The inner contour of the cap element 10 partially or completely forms a negative shape to a circumferential contour on the outer surface 34 of the first part 31 of the container 30. FIG. 1 shows a cross-section with such a form fit. By means of such an inverse shaping of the inner contour of the cap element 10, a particularly reliable hold on the primary cap 31 of the container 30 can be established. The cap element 10 forms a form-fitting secondary cap which, as an adapter for the primary cap 31, realises a geometry compensation and provides a stable and firm hold on the container 30. FIG. 2 shows an exemplary fastening geometry of the cap element 10 without a positive locking fit.

The cap element 10 can be fitted or pushed onto the first part 31 of the container 30 by means of tolerable contact pressure, so that the two components lock together. In addition, the cap element 10 may have a recess, slot and/or indentations which provide a degree of resilience such that the cap element 10 can deform elastically when placed on the primary cap 31.

The cap element 10 may be of one-piece or multi-piece configuration. It has a first upper cap section 17 and a second lower cap section 18 relative to a longitudinal axis L of the cap element 10. The longitudinal axis L represents, for example, a central centre axis with respect to which the container 30 and the cap element 10 are substantially rotationally symmetrical. The longitudinal axis L can therefore also be regarded as the longitudinal axis of the labelling arrangement 1 and/or of the container 30.

Preferably, the interlocking structure 13 comprises at least one interlocking element 131 configured to engage a recess on the outer surface 34 of the first part 31 of the container 30 when the cap element 10 is attached to the first part 31 of the container 30 and to couple the cap element 10 to the first part 31 of the container 30 (see FIGS. 18A-18F). For example, the interlocking elements 131 are each in the form of an engagement hook 16 which is arranged to form a positive locking connection with the first part 31 of the container 30 so that a holding force is established between the cap element 10 and the first part 31 in the direction of the longitudinal axis L with respect to the longitudinal axis L of the cap element 10.

When applied to the container 30, the cap element 10 is placed on the primary cap 31 and preferably extends up to the second part 32 of the container 30 so that a homogeneous, in particular flush, outer surface is formed. For example, the lower cap section 18 covers a neck of the syringe, which is a transition 33 between the first and second parts 31 and 32 of the container 30 (see e.g. FIGS. 1 and 2). In this way, the adapted container 30 with the attached secondary cap 10 can be labelled easily and reliably. The labelling arrangement 1 or the cap element 10 thus also contributes to an advantageous labelling capability of the container 30.

FIG. 3 also shows an arrangement of the sealing label 20 on the container 30 and the cap element 10. The sealing label 20 also has a severing area 24 with respect to the longitudinal axis L, between the first and second label sections 21 and 22, in which perforations are predefined which implement a severing element 25. The severing element 25 enables a controlled and predetermined tearing of the sealing label 20 and can have a single, double or multiple perforations which are predeterminedly introduced into the sealing label 20 as possible weakening lines (see FIGS. 6A-6C).

FIG. 4 shows an embodiment of the cap element 10, which has a predetermined surface structure 121 in the form of grooves or recesses on an outer surface 12, which contribute to a better feel and grip when opening the container 30 provided with the labelling arrangement 1. Easy untwisting and/or peeling of the cap element 10 together with the primary cap 31 of the container 30 can also be achieved by other shapes and surface structures 121 of the secondary cap 10 (see FIGS. 5, 7A and 7B, 13B-13E).

FIGS. 7A and 7B show, in schematic plan view, exemplary embodiments of the cap element 10 with different external geometries.

Figure 8:
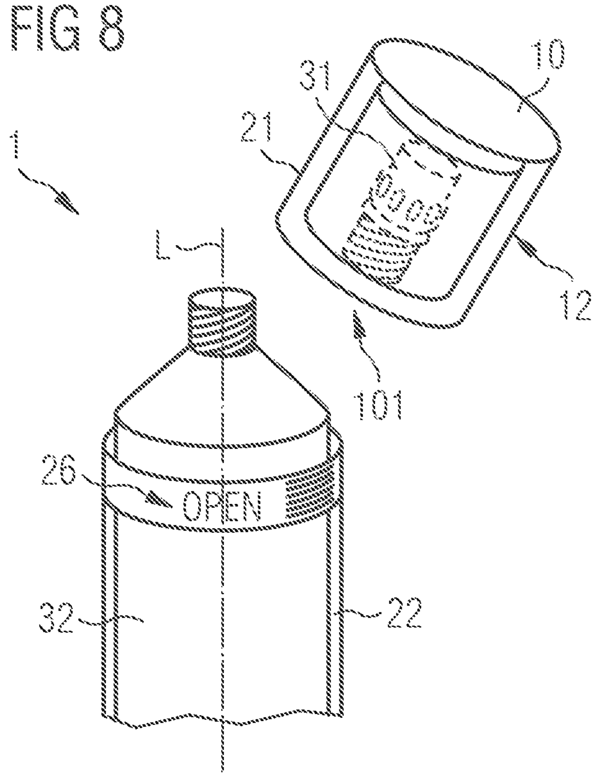

FIGS. 8 to 12 show further embodiments of the labelling arrangement 1. FIG. 8 illustrates an opened state of the container 30 to which the labelling arrangement 1 is attached. The cap element 10 has been removed from the container body 32 by twisting and/or pulling, thus opening the container 30. The primary cap 31 of the container 30 is within the removed cap element 10, which remains in the cap element 10 due to the interlocking positive fit between the cap element 10 and the first part 31 of the container 30.

The sealing label 20 has been pre-determinedly cut through, leaving the first label portion 21 on the cap element 10 and the second label portion 22 on the second part 32 of the container 30. Furthermore, an opening detection element 26 is illustrated, which represents a clearly recognisable indication in the form of a lettering that the container 30 has been opened or that an initial opening has already taken place. The opening detection element 26 may be provided by an at least partial double or multilayer of the sealing label 20. For example, the second label section 22 is double-layered and has "OPEN" written on a lower label layer facing the container body 32 in the severing area 24.

The first label portion 21 then extends, for example, onto the second label portion 22 or at least onto the lower label layer of the second label portion 22 and covers the lettering in a non-opened state of the labelling arrangement 1, so that the opening detection element 26 is not yet visible from the outside. When opened, the first label portion 21 is removed together with the cap element 10. Thus, the overlap area between the first label portion 21 and the lower label layer of the second label portion 22 is separated and the opening detection element 26 is exposed.

Figure 9:
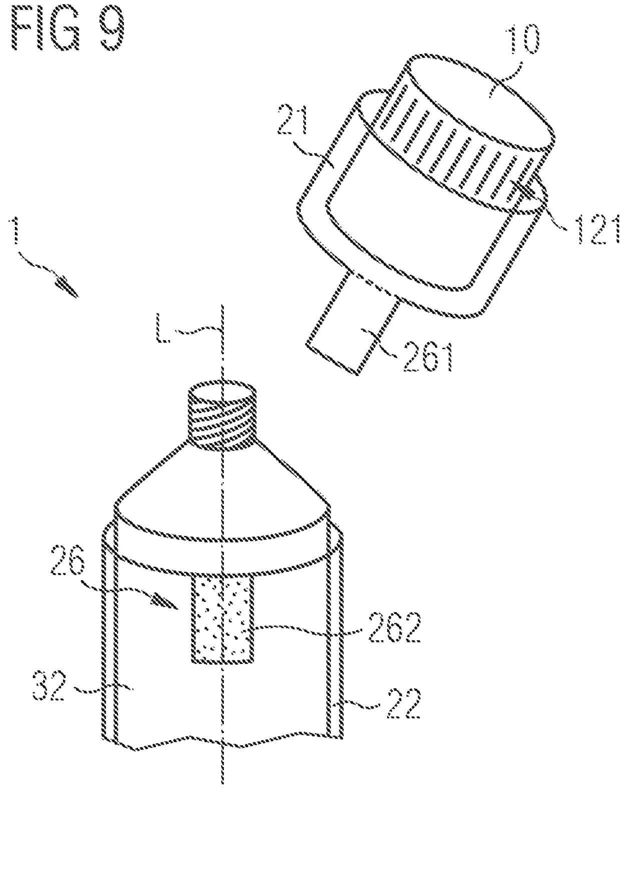

FIG. 9 shows another embodiment of the labelling arrangement 1, in which the opening detection element 26 comprises a first partial element 261 and a second partial element 262. The first partial element 261 may be formed as an extended portion of the first label portion 21, which covers the second partial element 262 in a non-opened state of the container 30. The sealing label 20 has, for example, a perforation in the region of the opening element 26 which is predetermined to tear when the container 30 is opened and the cap element 10 is removed. In this way, the second partial element 262 is exposed, which is configured, for example, as a clearly recognisable coloured surface. In particular, the coloured area of the second partial element 262 serves as a first opening indication, but also the first partial element 261 protruding from the first label portion 21 forms a recognisable first opening indication as a label flag.

Figure 10:
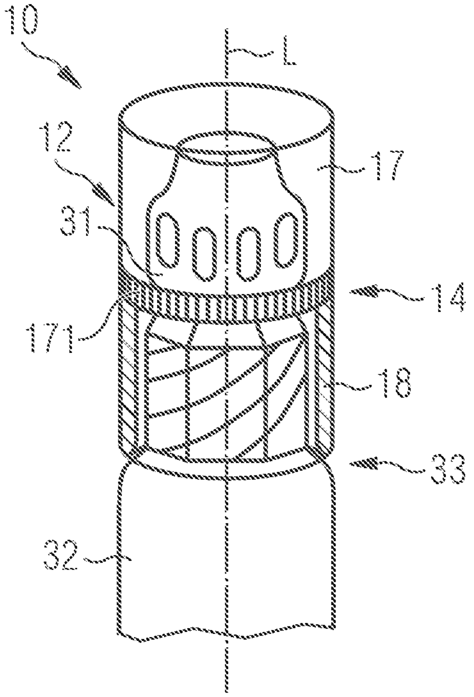
Figure 11:
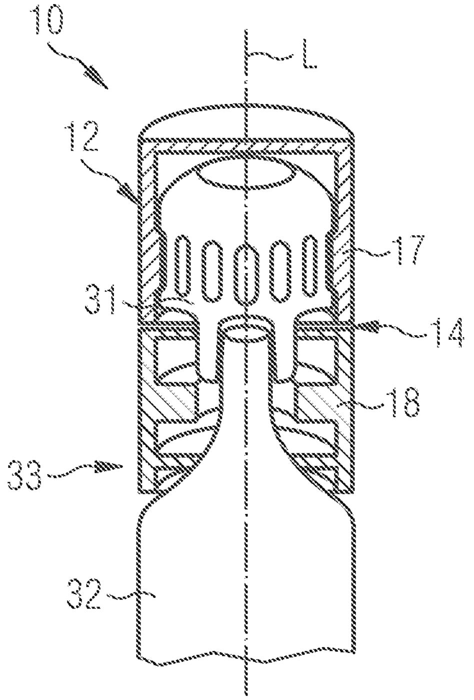
Figure 12:
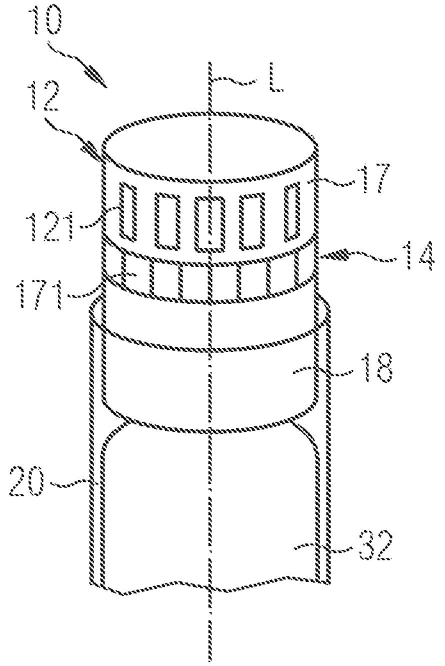
Figure 13A:
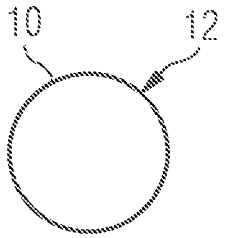
Figure 13B:
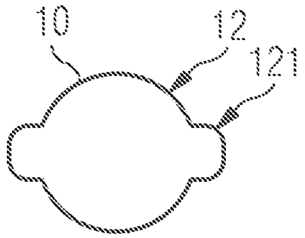
Figure 13C:
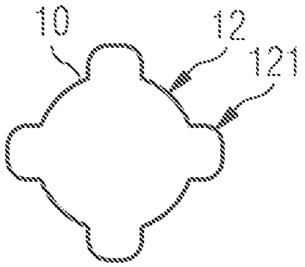
Figure 13D:
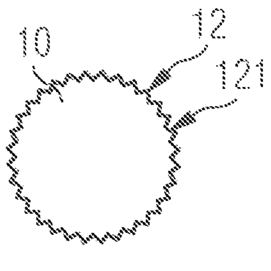
Figure 13E:
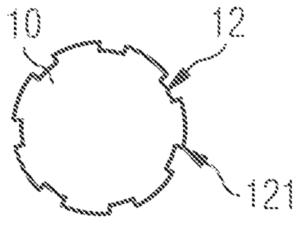

FIGS. 10 to 12 show further embodiments of the labelling arrangement 1 with a two-piece cap element 10. FIG. 10 shows the container 30, for example realised as a Luer-Lock glass syringe with a fixed thread. The upper cap section 17 is connected to the lower cap section 18 by means of a plurality of connecting webs 171. The area of the connecting webs 171 forms a separation area 14 of the cap element 10, in which a predetermined separation of the labelling arrangement 1 takes place when the container 30 is opened. When the first, upper cap section 17 is opened by turning it, the connecting webs 171 break open and the upper part of the cap element 10 or the upper cap section 17 can be removed together with the first part 31 of the container 30 from the lower cap section 18 and the second part 32 of the container 30 (see also FIG. 15). The second, lower cap section 18 remains after opening, for example, on the container body 32 or on the neck of the container 30. According to such an embodiment, the sealing label 20 can also extend only to the lower cap section 18 and may not have a severing area itself (see also FIG. 12). Alternatively, the sealing label 20 can extend to the upper cap section 17 and additionally have a severing area 24.

FIG. 11 illustrates a two-part design of the cap element 10 in which no connecting webs are provided which break open when the container 30 is opened. According to such an embodiment, the sealing label 20 preferably extends to or onto the upper cap section 17 and has a severing area 24. Alternatively, in such an embodiment, connecting webs 171 may also be provided to provide a fastening geometry with or without a positive locking fit to the primary cap 31.

FIGS. 13A to 13E show, in a schematic view from above in the direction of the longitudinal axis L, embodiments of the cap element 10 with different external geometries. By means of a predetermined surface structure 121, a desired haptic and grip of the cap element 10 can be provided, which can contribute to a low-force twisting on and/or pulling off of the cap element 10 together with the internal latched primary cap 31.

Figure 14:
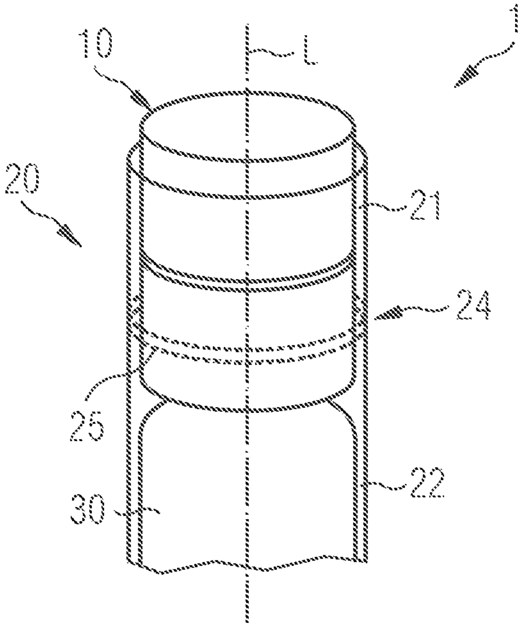

FIGS. 14 to 17 illustrate further embodiments of the labelling arrangement 1. FIG. 14 illustrates the sealing label 20 extending to an upper cap section 17 of the cap element 10 and having a severing area 24 with a double perforation forming respective severing elements 25.

Figure 15:
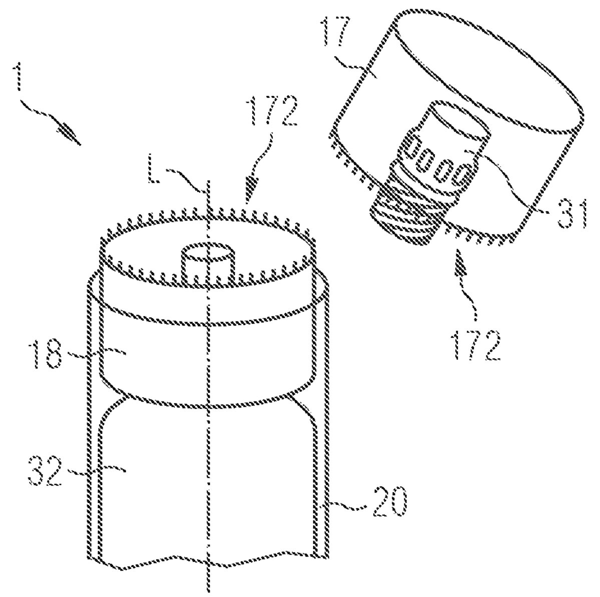

FIG. 15 illustrates the cap element 10 in a two-piece configuration in which the sealing label 20 extends onto the lower cap section 18 of the cap element 10. The cap element 10 includes a severance portion 14 above an upper edge of the sealing label 20, which includes a plurality of connecting webs 171 connecting the upper and lower cap sections 17 and 18 in a non-opened condition of the container 30. In the illustrated opened state of the container 30, portions 172 of the broken connecting webs 171 remain on the lower and upper cap sections 17 and 18, and clearly indicate that the container 30 has been opened.

Figure 16:
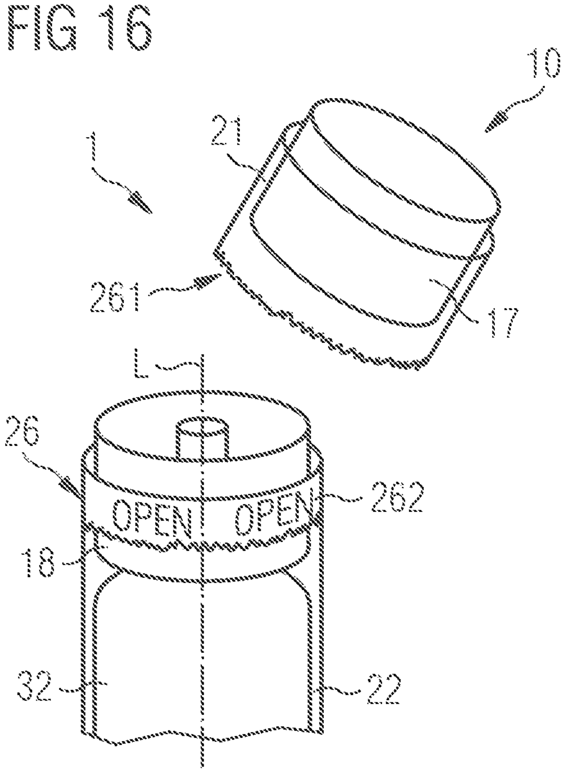

FIG. 16 illustrates an opened state of the container 30 in which, when the cap element 10 is removed, the first label portion 21 has been predeterminedly torn away from the second label portion 22. In addition, an opening detection element 26 in the form of lettering has been exposed. A torn lower edge of the first label portion 21 already indicates an initial opening and can serve as a first partial element of the opening detection element 26. In particular, the exposed lettering, as a second partial element 262 of the opening detection element 26, provides a clearly visible indication that the container 30 has been opened. The lettering may also be coloured and/or have a coloured background.

FIG. 17 shows an alternative embodiment of the labelling arrangement 1. The lettering can also be coloured and/or have a coloured background. Furthermore, the protruding label flag forming the first partial element 261 of the opening detection element 26 may optionally be designed to be removable from the first label portion 21, for example to serve documentation purposes.

FIGS. 18A to 18F show embodiments of the cap element 10 in various views. FIG. 18A shows a schematic cross-sectional view of the sleeve-shaped cap element 10. The cap element 10 is made in two parts, wherein the lower cap section 18 of the cap element 10 forms a section of the secondary cap which can be slid over a Luer-Lock thread of a syringe, for example. The lower secondary cap section 18 may also be individually designed as a ring with a recess or gap 19, which on the one hand provides a certain elasticity and deformability of the lower cap section 18 and on the other hand allows fluid exchange through a wall of the cap element 10 (see FIG. 18D). Such a recess 19 allows gas or liquid to escape to the outside from a space between the primary cap 31 and the secondary cap 10 (see also FIG. 18E).

The upper cap section 17 of the cap element 10 forms a portion of the secondary cap which can be slid over the primary cap 31 of the container 30. Also shown are bevelled engagement hooks 16, which also function as interlocking elements 131. The bevel is designed to taper in the direction of an open end 101 of the cap element 10 and allows the secondary cap 10 to be pushed onto the container 30 from above in a simple and guided manner Several spaced-apart engagement hooks 16 can be formed, or a circumferential engagement ring can be formed with respect to the longitudinal axis L. The one or more latching hooks 16 snap into a recess of the syringe below a Luer-Lock thread, which is formed as an annular groove, for example, between the Luer-Lock thread and a shoulder of the syringe body 32.

In addition, further toothed elements 131 are arranged on an inner surface 11 which extend substantially vertically or in the direction of the longitudinal axis L and form bevelled contact pressure spring elements. The upwardly formed bevel of the toothed elements 131 again allows the cap element 10 to be easily pushed onto the syringe or container 30 from above. The toothed elements 131 then press from the inside against the outer surface 34 of the Luer-Lock thread 31. Preferably, an undercut is thereby avoided. For example, the toothed elements 131 are arcuate and provide a degree of flexibility during placement. Should one or more of the toothed elements 131 directly encounter a protrusion of the first part 31 of the container 30 during push-on, the pressure spring element or the toothed element 131 can bend away to one side and nestle in a suitable position against the outer contour of the first part 31. As a result, even non-directional sliding of the cap element 10 allows reliable attachment of the secondary cap to the container 30.

The upper and lower cap sections 17 and 18 are also connected to each other by frangible connecting webs 171. When the container 30 or the syringe provided with the labelling arrangement 1 is turned open, the connecting webs 171 break through (see also FIG. 15).

A lower edge of the upper cap section 17 preferably has a bevelled bulge 15, which also allows the cap element 10 to be pushed on easily from above. The bulge 15 may further contribute to a stable and secure fit of the cap element 10 to the primary cap 31 by sliding the bulge over or onto a bead on the primary cap 31 of the container 30.

A wall thickness of the cap element 10 is preferably designed to match any difference in diameter between the first part 31 and the second part 32 of the container 30. In this way, the cap element 10 can form a geometry compensation between the Luer-Lock adapter 31 and the syringe barrel 32 as an adapter.

The lower cap section 18 may also be formed separately from the upper cap section 17 and be fitted onto the container 30. One or more recesses may be provided to allow easy sliding on (see FIG. 18D). In this way, larger diameters on a Luer-Lock adapter 31 can be overcome by means of the recess 19 according to a snap ring principle.

FIGS. 18B and 18C show schematic cross-sectional views of a toothed element 131 along the dashed line AA' in FIG. 18A. The interlocking toothed elements 131 may extend radially inwardly away from the wall of the cap element 10 and have a widened end which may engage recesses on the outer contour 34 of the primary cap 31.

FIG. 18F shows a perspective view of the cap element 10, showing another possible configuration of the interlocking structure 13 on the inner surface 11 of the cap element 10. Such an embodiment with equidistant recesses and toothed elements 131, which are arranged or formed radially circumferentially, is particularly suitable for fitting on conventional Luer-Lock primary closures 31 of syringes 30. Each second toothed element 131 has, at a lower end facing the open end 101 of the cap element 10, a respective bevelled engagement edge or engagement hook 16. In this way, a vertical holding force can be established by means of the engagement hooks 16 and a rotational holding force of the cap element 10 on the primary cap 31 can be established by means of the toothed elements 131.

The adapter or secondary cap 10 has mechanical structures with the interlocking structure 13 in an inner area, which fulfil two functions. On the one hand, a toothed element 131 in the form of a snap-in hook 16, which forms an internal mechanical projection of the secondary cap 10, snaps into a horizontal notch of the primary cap 31, for example. On the other hand, the toothed elements 131 interlock, for example as vertical inner structures in the form of flexible webs or according to a negative form of an outer primary cap structure, with the outer structures of the primary cap 31. These two functions mean that when the secondary cap 10 is rotated, it can be unscrewed from the syringe 30 together with the primary cap 31 and then remains with the primary cap 31 and can be disposed of together. In the case of Luer-Lock glass syringes, the secondary cap 10 is preferably made in two parts, whereby the two cap sections 17 and 18 can be connected to each other by connecting webs 171. The lower cap section 18 of the secondary cap 10 snaps with a protrusion, for example in the form of one or more engagement hooks 16, into or onto the lower edge of the Luer-Lock thread, while the upper cap section 17 snaps with its internal interlocking structure 13 into one or more notches of the primary cap 31 and can interlock with the outer structure of the primary cap 31.

According to a further embodiment, the labelling arrangement 1 may also be configured such that the first label portion 21 of the sealing label 20 surrounds the first part 31 of the container 30 in a sleeve-like manner without being adhesively coupled to or with the first part 31 of the container 30. The first label portion 21 can thus enclose the secondary cap or the cap element 10 all around without contact or without adhesion with respect to the longitudinal axis L. The first label portion 21 then forms a label sleeve which is open at the top with respect to the longitudinal axis L. When the container 30 is opened, the first label portion 21 is pressed against the outer surface 12 of the cap element 10 and is separated from the second label portion 22 by pulling and/or turning and is removed together with the secondary cap 10 from the second part 32 of the container 30.

According to such an embodiment, the sealing label 20 also has a severing area 24 in which, for example, a perforation is formed as a severing element 25, which enables a predetermined tearing of the sealing label 20. Alternatively or additionally, a tear strip can also be arranged in the severing area 24 in order to enable controlled tearing of the sealing label 20. Alternatively, a film element, such as an acetate film, may be provided as a tear-through element, which has a low tear resistance. The foil element tears through when the first label portion 21 and the cap element 10 are twisted and/or pulled, so that an initial opening is clearly visible. Such a foil element thus allows the sealing label 20 to be torn through without the need for a perforation or a tear strip.

Even if the first label portion 21 according to such an embodiment does not make adhesive contact with the cap element 10, reliable tamper-resistance of the labelling arrangement 1 can be achieved. The first label portion 21 is preferably designed in such a way that there is only a narrow gap or space between the attached cap element 10 and the surrounding first label portion 21. Manipulation or an attempt to open the label by reaching into the narrow gap leads to tearing or crumpling of the first label portion 21, so that such an operation leaves recognisable traces.

FIG. 19 shows a schematic representation of a further embodiment of the labelling arrangement 1 or of the cap element 10. The cap element 10 is constructed in two parts without connecting webs. The two separate cap sections 17, 18 are arranged at a distance from each other on the primary cap 31 of the container 30. Between the cap sections 17, 18 extends an area of the first part 31 of the container 30 which, in relation to an extension transverse to the longitudinal axis L, is wider than the upwardly and downwardly adjoining areas of the primary cap 31. The primary cap 31 thus has a bead 35 which realises the widest point of the first part 31 of the container 30. For example, the primary closure 31 forms a closure of a syringe with a Luer thread which has a larger diameter at the widest point than the adjacent regions of the syringe head and syringe body 32.

The cap sections 17, 18 of the cap element 10 then cover, as adapter parts, the areas of the primary closure 31 that have a smaller diameter than the syringe body 32 and the bead 35 of the primary closure 31. This also contributes to a uniform diameter progression or circumferential uniformity of the container 30 and thus to improved labelling capability. If the primary closure 31 has a bulbous shape, as indicated in FIG. 19, the cap sections 17 and 18 are preferably formed to match the bulbous shape. For example, a respective inner wall of both cap sections 17 and 18 is funnel or wedge shaped to follow the geometry dictated by the primary cap 31. A respective outer wall of the cap portions 17 and 18 is preferably cylindrical in shape to provide a uniform or low-curvature and easily labelled outer surface.

Furthermore, the cap element 10 can also be formed in two parts without connecting webs. The two separate cap sections are then arranged, for example, spaced apart from each other on the primary cap of the container 30. Such a design is suitable, for example, if an area of the primary part of the container to be arranged between the cap sections 17, 18 is wider than the areas adjoining it at the top and bottom. The primary closure 31 has, for example, a bead which realizes the widest part of the first part of the container 30 transversely to the longitudinal axis.

For example, the syringe body 32 has a diameter of 10.85 mm, while the bead 35 on the syringe head 31 has a diameter of 10.95 mm. When the cap element 10 is fitted, for example, the annular lower cap section 18 can then be slid over the bead 35. The lower cap section 18 is preferably slotted and has an expansion joint or recess which allows it to be slipped over the bead 35 (see FIG. 18D). In this way, a thickness difference of about 0.1 mm of the bead 35 can be easily and safely overcome. Alternatively or additionally, the lower cap section 18 may also provide some material-specific stretchability to allow easy and reliable placement on the first part 31 of the container 30. Subsequently, the upper cap section 17 can then be placed on the syringe head 31. A gap between the upper and lower cap sections 17 and 18 then forms an uncovered area of the container head 31.

Another way of arranging the cap element 10 on the first part 31 of the container 30 with the bead 35 is that the annular lower cap section 10 is placed on the container head 31 prior to the primary closure, and subsequently the primary closure is attached to the container head 31. With respect to a Luer threaded syringe 30, the primary closure is then threaded into the thread provided on the container head 31. The lower annular cap section 18 does not then require, for example, a slit to provide expandability. The upper cap section 17 can then be fitted. Over-labelling of the existing gap and the bead 35 arranged therein is easily and reliably possible.

FIG. 20 shows an embodiment example for a flow chart of a method for applying or attaching a labelling arrangement 1 to the multi-part container 30.

In a step S1, the secondary cap 10 is first placed on the primary cap 31 of the syringe 30. This preferably comprises aligning the primary and secondary caps 31 and 10 relative to each other. Such alignment may in particular comprise rotating the cap element 10 until a functionally correct alignment of the cap element 10 with respect to the outer structure of the first part 31 of the container 30 is achieved. Subsequently, the cap element 10 is placed or pushed onto the primary cap 31 and pushed in the direction of the container body 32 until the cap element 10 engages and locks into a recess of the primary cap 31 by means of a snap-in hook 16. In this way, a vertical holding force of the primary and secondary caps 31 and 10 against each other can be established.

In a step S3, the secondary cap 10 may be rotated relative to the primary cap 31 to form a stable and secure interlocking of the interlocking structure 13 of the secondary cap 10 with the outer surface 34 of the primary cap 31. In this way, a horizontal holding force of the primary and secondary caps 31 and 10 against each other can be established.

In a further step S5, the sealing label 20 is then applied to the syringe body 32 and the secondary cap 10 to seal the container or syringe 30.

The sealing label 20 and/or the cap element 10 comprise a severing area 24 and/or 14, preferably formed or arranged to be located in the transition portion 33 between the syringe body 32 and the secondary cap 10 and the syringe head 31 respectively. When the secondary cap 10 is rotated, the sealing label 20 and/or the cap element 10 is predeterminedly destroyed along the severing area 24 and/or 14 and the secondary cap 10 can be unscrewed and/or removed from the syringe 30 together with the primary cap 31. The primary cap 31 remains fixed inside the secondary cap 10.

REFERENCE SIGNS

1 labelling arrangement
10 cap element/secondary cap
101 open end of the cap element
11 inner surface of the cap element
12 outer surface of the cap element
121 surface structure of the outer surface
13 interlocking structure of the cap element
131 toothed element of the interlocking structure
14 severing area of the cap element
15 bevelled protrusion of the cap element
16 bevelled snap-in hook of the cap element
17 upper cap section of the cap member
171 connecting web between the cap sections
172 portion of connecting web
18 lower cap section of the cap element
19 recess of the cap element
20 sealing label
21 first label portion of the sealing label
22 second label portion of the sealing label
24 severing area of the sealing label
25 severing element/perforation/film element
26 opening detection element
261 first partial element of the opening detection element
262 second partial element of the opening detection element
30 container/syringe
31 first part of the container/primary cap
32 second part of the container/syringe body
33 transition between the first and the second part
34 outer surface of the first part
35 bead of the first part
L longitudinal axis
S(i) step of a method for applying a labelling arrangement

The invention claimed is:

1. A labelling arrangement for a multi-part container comprising:

a sleeve-shaped cap element having an interlocking structure on an inner surface and configured to be applied to a first part of the container and coupled to an outer surface of the first part by means of the interlocking structure, and a sealing label having a first label portion and a second label portion adjacent to the first label portion, the second label portion is configured to be attached to a second part of the container, and the first label portion is configured, with respect to a state of the sealing label, to be applied to the container to surround the applied cap element with respect to a longitudinal axis, wherein the labelling arrangement further comprises at least one severing area, so that when the container applied with the labelling arrangement is opened, the labelling arrangement is severable in the severing area and at least a part of the cap element is removable together with the first part of the container from the second part of the container wherein the interlocking structure has at least one toothed element which is configured to engage in a recess on the outer surface of the first part of the container when the cap element is fitted to the first part of the container and to couple the cap element to the first part of the container; and wherein the at least one toothed element comprises:

a snap-in hook configured to form a positive-locking connection with the first part of the container, so that with respect to the longitudinal axis of the cap element, a holding force is established between the cap element and the first part in the direction of the longitudinal axis.

2. The labelling arrangement according to claim 1, wherein the first label portion of the sealing label is configured to be attached to the applied cap element with respect to a state of the sealing label applied to the container, so that the sealing label couples the cap element to the second part of the container.

3. The labelling arrangement according to claim 1, wherein the sealing label comprises a severing area disposed between the first and second label portions, so that, when the container applied with the labelling arrangement is opened, the sealing label is severable in a predetermined manner in the severing area of the sealing label and the first label portion is removable together with the at least one part of the cap element and the first part of the container from the second label portion and the second part of the container.

4. The labelling arrangement according to claim 1, wherein the cap element is formed in two parts and has a severing area, the cap element having a first cap section and a second cap section with respect to the longitudinal axis of the cap element, and the severing area of the cap element is formed between the first and second cap sections, so that when the container applied with the labelling arrangement is opened, the cap element is predeterminedly severable in the severing area of the cap element and the first cap section is removable together with the first part of the container from the lower cap section and the second part of the container.

5. The labelling arrangement according to claim 1, wherein the cap element has on the inner surface a contour which comprises the interlocking structure and which is preformed in coordination with a contour on the outer surface of the first part of the container.

6. The labelling arrangement according to claim 5, wherein, with respect to the longitudinal axis of the cap element, the cap element has, on the inner surface, a circumferential contour which forms a negative shape with respect to a circumferential contour on the outer surface of the first part of the container.

7. The labelling arrangement according to claim 1, wherein the cap element has a recess which penetrates a wall of the cap element, so that a fluid exchange can be formed between an inner space and an outer space of the cap element.

8. The labelling arrangement according to claim 1, comprising:

an adhesive layer arranged on an underside of the sealing label so that the sealing label is attachable to the container by means of adhesion, wherein the sealing label has an adhesive-free surface in the separation area.

9. The labelling arrangement according to claim 1, wherein the respective severing area is formed in coordination with the container in a region of the cap element and/or of the sealing label which, with respect to an applied state of the labelling arrangement on the container, is associated with a transition between the first part and the second part of the container.

10. The labelling arrangement according to claim 1, wherein a severing element is provided in the severing area.

11. The labelling arrangement according to claim 1, comprising:

an opening detection element that is arranged in the severing area of the cap element and/or the sealing label and that is configured to indicate a removal of at least a part of the cap element and/or the first label portion together with the first part of the container from the second part of the container.

12. Use of a labelling arrangement according to claim 1 for a container that is divisible into several parts.

13. A system comprising:

a container divisible into a plurality of parts comprising a first part and a second part, and the labelling arrangement according to claim 1, which is applied to the container such that the second label portion of the sealing label is attached to the second part of the container and the first label portion of the sealing label is attached to the cap element applied to the first part of the container.

14. The labelling arrangement according to claim 1, wherein the at least one toothed element further comprises a web or pin configured with respect to the longitudinal axis of the cap element to form a positive-locking connection with the first part of the container, so that with respect to the longitudinal axis of the cap element, a retaining force is provided in a radial direction between the cap element and the first part.

15. A method for applying a labelling arrangement to a multi-part container, comprising:

providing a container divisible into multiple parts comprising a first part and a second part, providing a sleeve-shaped cap element having an interlocking structure on an inner surface thereof, providing a sealing label having a first label portion and a second label portion adjacent to the first label portion, the cap element and the sealing label forming the labelling arrangement which has at least one severing area, placing the cap element on the first part of the container and coupling the interlocking structure of the cap element to an outer surface of the first part of the container by attaching the cap element to the first part of the container so that a toothed element of the interlocking structure engages a recess on an outer surface of the first part, and attaching the sealing label to the container by attaching the second label portion to the second part of the container and surrounding the attached cap element with the first label portion with respect to a longitudinal axis of the cap element, so that, when the container applied with the labelling arrangement is opened, the labelling arrangement is severable in the severing area and at least a part of the cap element together with the first part of the container is removable from the second part of the container wherein the at least one toothed element comprises:

a snap-in hook configured to form a positive-locking connection with the first part of the container, so that with respect to the longitudinal axis of the cap element, a holding force is established between the cap element and the first part in the direction of the longitudinal axis.

16. The method of claim 15, wherein attaching the sealing label to the container comprises:

attaching the first label portion to the attached cap element such that the sealing label couples the cap element to the second part of the container.

17. The method according to claim 15, wherein placing and coupling the cap element to the first part of the container comprises:

aligning the cap element relative to the first part of the container with respect to the longitudinal axis of the cap element, sliding the cap element onto the first part of the container so that a toothed element of the interlocking structure engages in a recess on an outer surface of the first part, and rotating the cap element relative to the first part of the container with respect to the longitudinal axis of the cap element so that the toothed element of the interlocking structure engages in a recess on an outer surface of the first part.

18. The method according to claim 15, wherein the at least one toothed element further comprises a web or pin configured with respect to the longitudinal axis of the cap element to form a positive-locking connection with the first part of the container, so that with respect to the longitudinal axis of the cap element, a retaining force is provided in a radial direction between the cap element and the first part.

* * * * *